United States Patent [19]

Contin

[11] Patent Number: 4,718,637
[45] Date of Patent: Jan. 12, 1988

[54] HIGH VACUUM GATE VALVE HAVING IMPROVED METAL VACUUM JOINT

[75] Inventor: Jose L. Contin, Orinda, Calif.

[73] Assignee: MDC Vacuum Products Corporation, Hayward, Calif.

[21] Appl. No.: 40,198

[22] Filed: Apr. 20, 1987

Related U.S. Application Data

[62] Division of Ser. No. 881,074, Jul. 2, 1986, Pat. No. 4,681,329.

[51] Int. Cl.$^4$ .................... F16K 25/00; F16K 31/52
[52] U.S. Cl. .................................. 251/158; 251/203; 251/232
[58] Field of Search ............... 251/203, 169, 158, 201, 251/194, 232

[56] References Cited

U.S. PATENT DOCUMENTS

| | | | |
|---|---|---|---|
| 2,626,774 | 1/1953 | Palmer | 251/169 |
| 4,291,861 | 9/1981 | Faria | 251/158 |
| 4,491,145 | 1/1985 | Williams et al. | 251/203 X |

*Primary Examiner*—Arnold Rosenthal
*Attorney, Agent, or Firm*—David B. Harrison

[57] ABSTRACT

A two part high vacuum gate valve construction includes a control mechanism part having a limited displacement stem passing through a first generally rectangular high vacuum flange and a valve body part including a generally rectangular case, a second generally rectangular high vacuum joint providing flange having a mirror image sealing geometry to the first high vacuum flange, two machined fluid flow flanges passing through openings defined through opposite sidewalls of said case and sealed thereto, at least one of the fluid flow flanges having an inside gate sealing surface machined prior to insertion through and sealing of the flange to the sidewall of the case; a two part, levered carriage having a central transverse pivot joint and having an endwall engagement mechanims for causing the pivot joint to pivot toward the inside gate sealing surface of the one flow flange in response to continued actuation force supplied by the control stem shaft after an inside endwall of said case has been contacted; a valve gate having a sealing surface for engaging the inside gate sealing surface of the one flow flange when the carriage means is opposite the other flow flange the gate being pivotally attached to the carriage at the central transverse pivot joint, a double jointed linkage assembly having one link part pivotally fixed to the second flange and linked to the control stem shaft for double jointed arcuate movement as the shaft is moved along its locus of rectilinear limited displacement, and having a second link part linked to the first link part and to the carriage means, for levering actuation force supplied by the central stem shaft to the carriage thereby to cause the gate to close and then to seal.

10 Claims, 20 Drawing Figures

HIGH VACUUM GATE VALVE HAVING IMPROVED METAL VACUUM JOINT

This is a division of application Ser. No. 881,074, filed July 2, 1986 U.S. Pat. No. 4,681,329.

FIELD OF THE INVENTION

The present invention relates to apparatus for handling fluid flow in high vacuum operating environments. More particularly, the present invention relates to apparatus and methods for improving generally rectangular metal vacuum joints and providing improved high vacuum gate valves which incorporate, among other features, the improved joint construction and methods of the present invention.

BACKGROUND OF THE INVENTION

High vacuum gate valves are typically employed in extreme environments, such as are encountered in fabrication processes of integrated circuit semiconductors, for example. Other processes involving technologies such as low pressure chemical vapor deposition: sputtering, plasma, and the like, also require high vacuum joints in piping and reliable high vacuum gate valves. Such joints and valves are typically formed of high corrosion resistance materials such as stainless steel, and they may be adapted for operations at very high temperatures.

High vacuum gate valves typically provide for actuation from the ambient, ideally with no loss of vacuum level. Annular metallic sealing surfaces for such valves have been successfully provided in the past. One such annular sealing surface is illustrated in U.S. Pat. No. 3,208,758, a salient feature of which is reproduced herein as FIG. 1.

Figure 1:
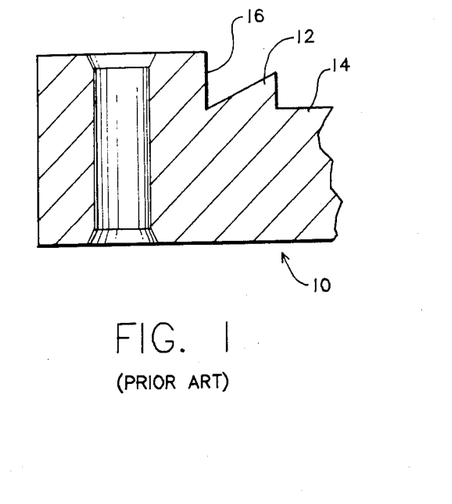
FIG. 1 is an enlarged corner portion sectional view of a flanged annular metal vacuum joint in accordance with the prior art.

Annular sealing surfaces, such as the one illustrated by the FIG. 1 flange 10, have been found to be readily formable because such surfaces, like the protruding portion 12 of the FIG. 1 flange 10, and the inwardly adjacent flat portion 14 and outwardly adjacent vertical wall 16 thereof, may be created by turning the flange workpiece relative to, and machining with an appropriate cutting tool or bit of a metal lathe.

Figure 2:
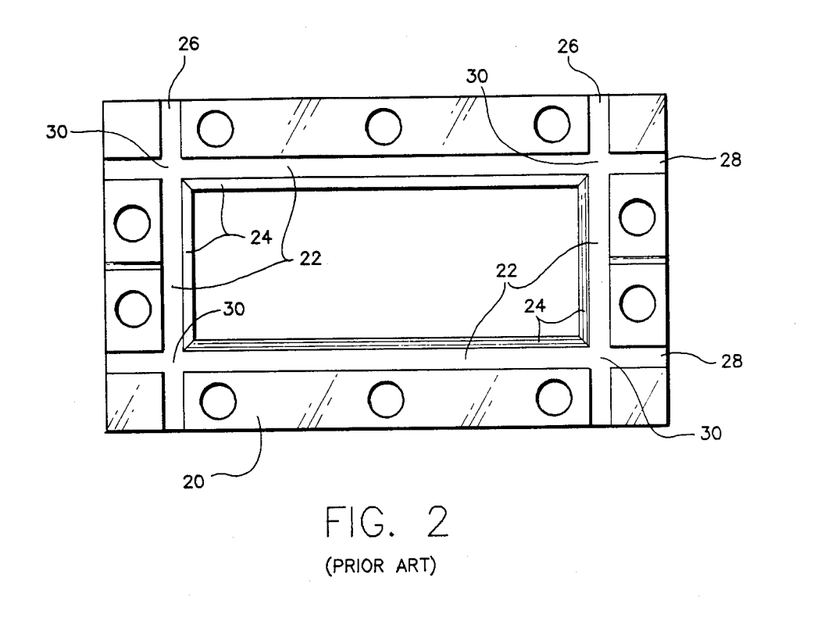
FIG. 2 is a top plan view of a prior art rectangular metal vacuum joint machined in accordance with the FIG. 1 section.

Generally rectangular sealing surfaces, such as the one illustrated in FIG. 2 herein, have proven to be very difficult to fabricate with prior art techniques. In FIG. 2 a rectangular flange 20 defines a generally rectangular sealing surface 22, and the inside peripheral ridge 24 of which forms a twenty degree angle with the plane of the sealing surface 22 of the flange 20. The inwardly rising ridge 24 is typically formed by end milling of the flange with a mill. In order to provide the sealing surface 22 with necessary clearance immediately outside the ridge 24 into which the gasket metal will flow under extreme clamping pressure, the prior practice has been to mill perpendicular slots 26, 28 all away across the flange, as shown in FIG. 2. The major drawback of this approach has been that at the corners 30, where different milling directions intersect, hand burnishing and polishing has been required in order to achieve the precision needed to achieve a high vacuum seal. A cold welded rectangular copper wire gasket was placed onto the sealing surface 24 and was caused to flow throughout the sealing area defined by the flange 20 and its complementary mating flange by virtue of extreme clamping pressure applied between the two flanges as by multiple bolts. The seals resultant from flanges formed like the flange 20 were not always reliable, and often developed leaks.

One high vacuum valve construction employing a generally rectangular sealing surface at the gate is depicted in U.S. Pat. No. 3,212,036. The generally rectangular sealing surface of the gate, which engaged a metal gasket material, was formed as a separate element from the gate and was subsequently welded onto the gate structure. One problem with welding of parts to the gate element is that it causes the gate to warp or buckle and thereby lose its precisely specified geometry and fail to achieve a reliable high vacuum seal.

Figure 3:
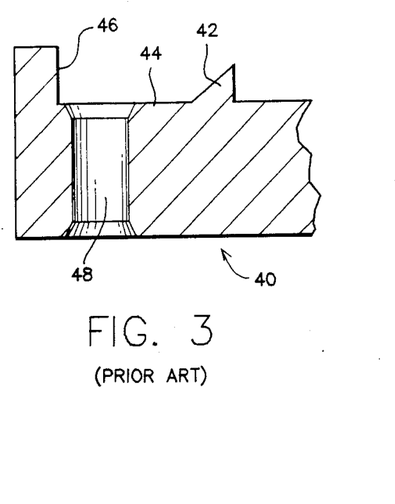
FIG. 3 is an enlarged corner portion sectional view of a flanged generally rectangular metal vacuum joint proposed in the prior art.

Another generally rectangular sealing surface employed in the prior art is illustrated in FIG. 3. Therein, a flange 40 includes an inwardly rising ridge 42 and a very wide recessed sealing surface 44 bounded by an outer wall 46. The width of the surface 44 was required by the fact that the end milling tool used to machine the slanted surface of the projecting ridge 42 had to clear the top of the wall 46 while the slanted surface. This created a severe problem in that the swaging pressure upon the copper gasket material generated by the ridge 42 as the flange 40 was clamped to its mating flange, failed to cause the copper gasket to flow all the way to the back wall 46. This failure resulted in a tendency of this prior joint to develop leaks. In addition, the copper gasket had to be formed around bolt openings 48, further increasing the tendency of this prior design to leak.

SUMMARY OF THE PRESENT INVENTION WITH OBJECTS

A first general object of the present invention is to provide a generally rectangular metal high vacuum joint for a pipe flange, gate valve, and the like, and method for making the same, which overcomes the limitations and drawbacks of the prior art.

A second general object of the present invention is to provide a gate valve of improved design and construction which overcomes limitations and drawbacks of the prior art by advantageously incorporating the improved generally rectangular metal high vacuum joint aspect of the present invention.

One aspect of the present invention is a flange which provides a high vacuum generally rectangular joint in combination with a second flange of mirrored geometry and a metal gasket compressed and swaged therebetween to achieve a high vacuum seal at the joint. The new flange includes a substantially planar face, a generally rectangular, continuously formed trough defined in the face, the trough being substantially semicircular in cross section, and a raised, substantially planar swaging surface continuously formed adjacently inward of and abutting the trough, the swaging surface having an outward upward slope angle with respect to the face.

A related aspect of the invention is the forming method for the flange which includes the steps of forming a substantially planar face on the flange, continuously forming a generally rectangular trough in said face having a substantially semicircular cross section, and then continuously forming a raised, substantially planar swaging surface adjacently inward of and abutting said trough in a manner by which said swaging surface has an upward and outward slope angle with respect to the plane of said sealing surface.

Another aspect of the present invention provides a two part high vacuum gate valve construction comprising a control mechanism part and a valve body part.

The control mechanism part includes a stand pipe housing; a linearly translatable control stem shaft; a baffle assembly including an expansible baffle having an accordion pleat baffle for sealing the stem shaft relative to the ambient, the baffle expanding and contracting longitudinally throughout the limited displacement range of the stem shaft; a first generally rectangular high vacuum joint providing flange to which the stem pipe housing is mounted and the bonnet is sealed on one major face, and having a central opening through which the shaft freely passes, and a high vacuum joint providing geometry on the other major face thereof enabling the control mechanism part to be removably joined to and sealed with the valve body part; and, a displacement mechanism, either manual or automatic, for controllably displacing the shaft.

The valve body part includes a generally rectangular case secured at an upper end to a second generally rectangular high vacuum joint providing flange having a mirror image sealing geometry to the first high vacuum joint providing flange; two machined fluid flow flanges passing through openings defined through opposite sidewalls of the case and sealed thereto, at least one of the fluid flow flanges having an inside gate sealing surface machined prior to insertion through and sealing of the flange to the sidewall of the case, the fluid flow flanges defining central flow passages and including outer sealing means enabling formation of high vacuum joints with piping to which the valve may be operationally attached; a two part, levered carriage having a central transverse pivot joint and having endwall engagement means for causing the pivot joint to pivot toward said inside gate sealing surface of the one flow flange in response to continued actuation force supplied by said control stem shaft after an inside endwall of said case has been contacted; a valve gate having a sealing surface for engaging the inside gate sealing surface of the one flow flange when the carriage means is opposite the other flow flange and having a back surface with a pivoted engagement mechanism, the engagement mechanism engaging the carriage at the central transverse pivot joint; a double jointed linkage assembly having one link part pivotally fixed to the second flange and linked to the control stem shaft for double jointed arcuate movement as the stem shaft is moved along its locus of rectilinear limited displacement, and having a second link part linked to the first link part and to the carriage, for levering actuation force supplied by the central stem shaft to the carriage thereby to cause the gate to close and then to be urged against the inside flow flange sealing surface in sealing engagement therewith.

In a further aspect of the present invention a manual displacement mechanism for the stem shaft includes a threaded stem extension and a journalled threaded rotation shaft are formed with complementary double threads, thereby halving the thread pitch per unit measure without reduction of mechanical engagement between the stem extension and the journalled rotation shaft.

In one more aspect of the present invention the double jointed linkage assembly comprises a stop dog formed on one of the one link part and second link part, and a stop pin formed on the other of the one link part and second link part, the stop dog for engaging the stop pin after the one link part and second link part have passed through longitudinal alignment to an over-center locking position, forcing the carriage to bend along its central stem shaft thereby to force the gate into sealing engagement with the inside sealing surface of the one flow flange.

In yet another aspect of the present invention, the pivoted engagement mechanism on the back surface of the valve gate is formed by the process of lathing two recessed annuli therein so as to define a raised annulus and then by milling off opposed equal length chords of the annulus thereby leaving two raised integral bosses which are pivotally engaged by the central stem shaft of the carriage.

In one more aspect of the present invention the baffle assembly includes a bonnet enclosure, a bushing mounted to the bonnet enclosure for precisely aligning the stem shaft for limited displacement rectilinear movement, an expansible baffle having an accordion pleat baffle with an interior space communicating with the ambient and an exterior space, the baffle having one end sealed to an inside end wall of the bonnet and having another end sealed to an annulus formed on the stem shaft, the baffle expanding and contracting longitudinally throughout the limited displacement range of the stem shaft.

These and other objects, advantages and features of the present invention will become even more apparent upon considering the following detailed description of preferred embodiments, presented in conjunction with the accompanying drawings.

DETAILED DESCRIPTION OF PREFERRED EMBODIMENTS

High Vacuum Generally Rectangular Metal Joint 50

Figure 4:
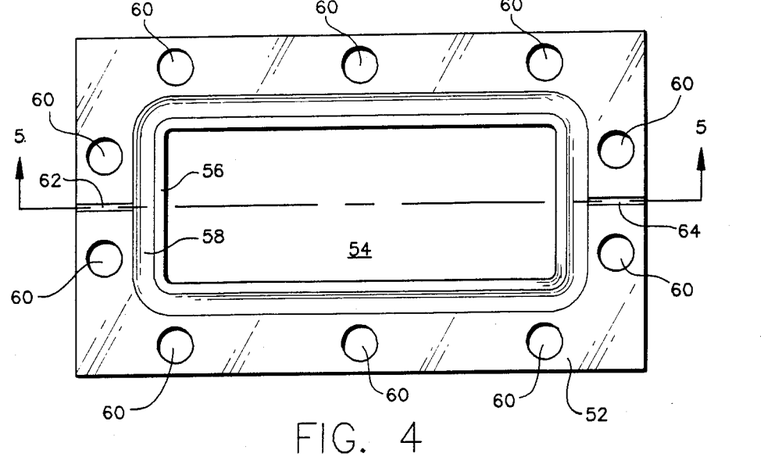
FIG. 4 is a top plan view of a flange defining a generally rectangular metal high vacuum joining surface in accordance with principles of the present invention.
Figure 5:
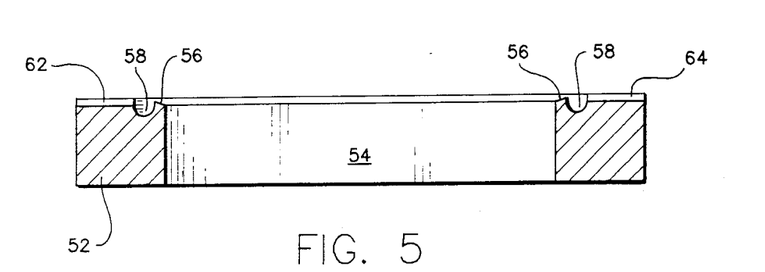
FIG. 5 is a view in elevation and section of the flange depicted in FIG. 4 taken along the line 5—5 therein.
Figure 6:
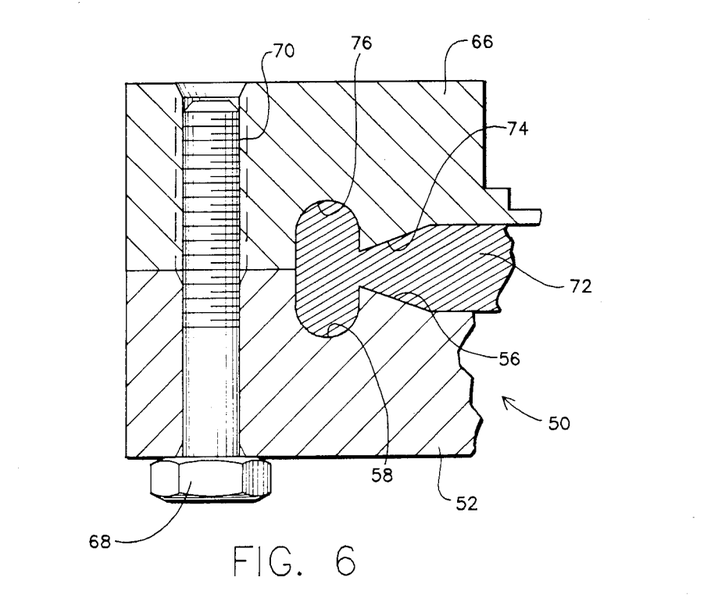
FIG. 6 is an enlarged sectional view of a generally rectangular metal high vacuum joint in accordance with principles of the present invention, formed by the joining surface depicted in FIG. 4, by an oppositely facing, symmetrical joining surface of a second flange clamped to the first flange, and by a ductile, flowable gasket metal swaged by the compression of the two flanges together so as to flow into and occupy a sealing space defined thereby.

An improved high vacuum generally rectangular metal joint 50 is illustrated in FIGS. 4, 5 and 6. Therein, a rectangular flange 52 defines a generally rectangular central opening 54 e.g. in order to accomodate linkage apparatus for a high vacuum gate valve 100 to be described and explained hereinafter. The flange 52 includes a continuously formed, outwardly and upwardly sloping, ridge portion 56 immediately outwardly adjacent to the central opening 54. Outside of the ridge portion 56, an annular well 58 is continuously formed. The ridge portion 56 and the annular well 58 are each formed by automatic CNC milling operations and are therefore very precise. Since the direction of slope of the ridge portion 56 is outward (as opposed to inward slope of the prior art ridge illustrated in FIG. 3, for example), there is no need to allow for clearance for the end milling tool bit relative to the flange 52.

Suitable clamp bolt holes 60 are defined through the flange 52 at suitable intervals. Narrow, shallow slots 62, 64 are also formed through opposite minor dimension ends of the flange, and these slots enables gases otherwise entrained in the well 56 to escape when the flange 52 is clamped to a mirror image flange, such as the flange 66 depicted in FIG. 6 by bolts 68 which have threads engaging inside threads formed in holes 70 in the flange 66, for example.

A suitable continuous metallic gasket 72, such as a stamped, generally rectangular copper sheet gasket, e.g. approximately 0.080" thick, is placed between the two flanges 52 and 66 before they are clamped together by the bolts 68. This soft metal gasket is swaged by the opposed ridges 56 and 74, and flows into and occupies the entire volume defined by the wells 58 and 76, of the flanges 52 and 66. The result, illustrated in FIG. 6, is an easily formed high vacuum metal joint 50 which does not leak.

High Vacuum Gate Valve 100

Figure 7:
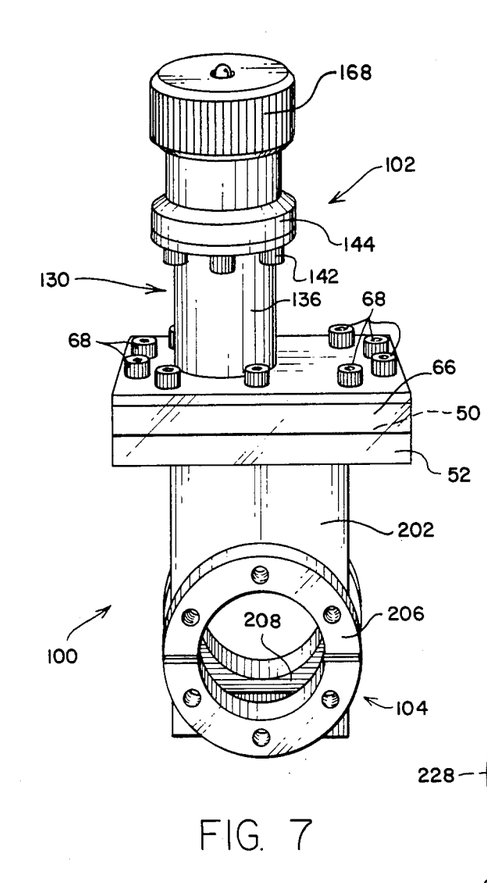
FIG. 7 is an isometric view of a high vacuum gate valve incorporating the principles of the present invention, including the generally rectangular metal high vacuum joint depicted in FIG. 6.

The joint 50 is preferably included as an important structural element of the improved high vacuum gate valve 100 illustrated in FIG. 7. Basically, the valve 100 is formed of two parts or sections, a control mechanism 102 and a valve body section 104. The structural elements making up a manual control mechanism section 102 are illustrated and discussed in connection with FIG. 8A, while the structural elements comprising an electropneumatic automatic control mechanism 103 are illustrated and discussed in connection with FIG. 8B. The same reference numerals are used in FIGS. 8A and 8B for the same structural elements. The structural elements making up the valve body section 104 are illustrated and discussed in connection with FIG. 9. The two sections 102 (or 103) and 104 are joined together at a non-leak joint previously described herein by the flanges 66 and 52 respectively.

Figure 8A:
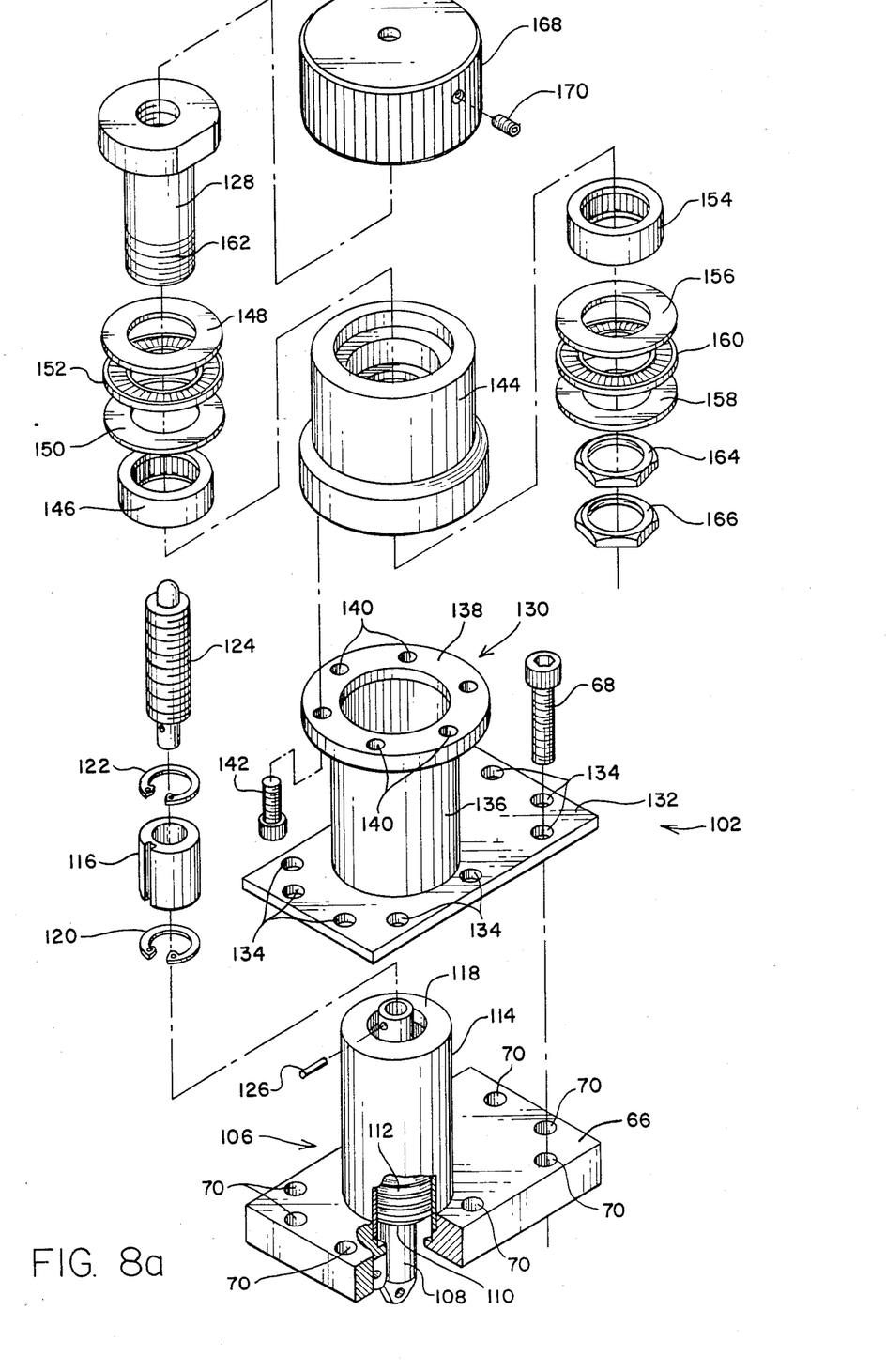
FIG. 8A is an isometric exploded assembly drawing of a manually operated control portion of the high vacuum gate valve depicted in FIG. 7, illustrating the components thereof.

Manual Control Mechanism 102 (FIG. 8A)

Turning now to the manual control mechanism 102 depicted in FIG. 8A, a bellows assembly 106 is formed on the flange 66, and the assembly 106 includes a central stem 108, an annular disk 110 continuously welded to the stem 108 at a central opening therethrough. A bellows element 112 is sealed at a lower end thereof to the outer periphery of the disk 110. A generally tubular bonnet 114 shrouds the bellows 112 and stem 108, and it is sealed to the flange 66 in an airtight arrangement, as by a continuous annular weld. The bellows is secured to, and sealed at the inside of a top end wall of the bonnet 108, so that the inside space defined by the bellows is at ambient air pressure, while the outside of the bellows may be at a high vacuum. The bonnet 114 is sized so that the stem 108 and attached bellows 112 are free to move in the inside space defined thereby without restriction, while providing a reliable vacuum barrier between the control mechanism and the interior space of the valve body mechanism 104.

In accordance with an important feature of the present invention, an elongated bronze bushing 116 is secured through a central opening of a thickened top endwall portion 118 of the bonnet 114 by two bushing retaining rings 120, 122. Unlike prior art bellows assemblies, such as the type illustrated in the referenced U.S. Pat. No. 3,212,036, the elongated bushing 116 guides the central stem 108 precisely along its axis of lineal movement and thereby minimizes lateral movements of the bellows 112 which otherwise increase metal fatigue and failure.

Figures 18, 19:
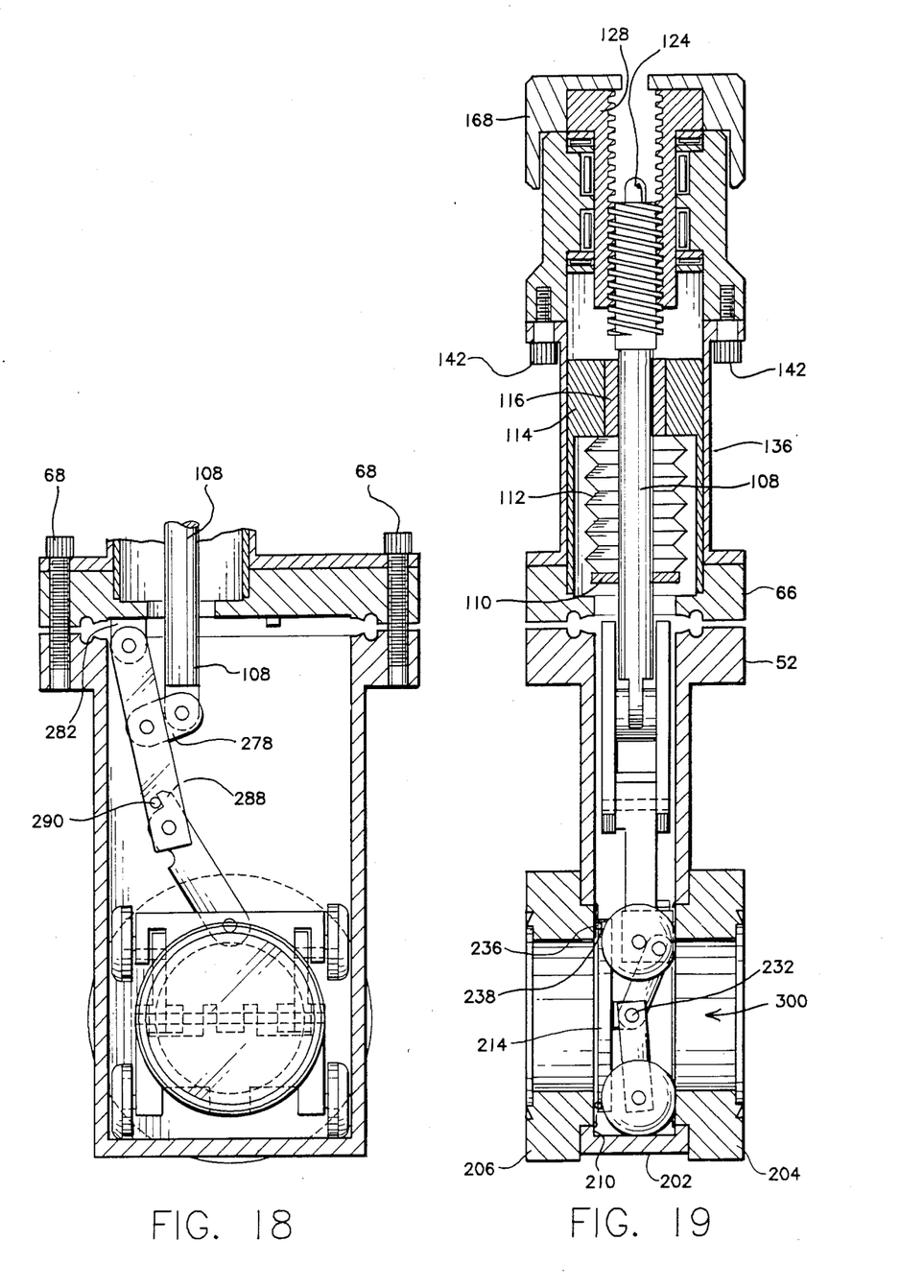
FIG. 18 is similar to the FIG. 16 view and shows the gate element in a closed, locked and sealing position.
FIG. 19 is similar to the FIG. 17 view and shows the gate element locked against its sealing surface as the control linkage assembly becomes locked against a locking position in accordance with a further aspect of the present invention.

In another aspect of the present invention, a double Acme standard threaded stem extension 124 is secured to the central stem 108 by a recessed pin 126. Each of the two equally-spaced-apart helixes forming the threads on the extension 124 has a pitch of approximately five turns per inch. By using a pair of helical threads, a substantial mechanical engagement is achieved between the threads of the extension 124 and inside threads of a bearing shaft 128; at the same time, the manual control section 102 requires but about six turns to move a gate of the valve 100 from a fully open position (FIGS. 12 and 13) to a fully closed and locked position (FIGS. 18 and 19). In many industrial processes, it is essential that the valve 100 be capable of rapid, yet precise actuation, and the use of the double threads achieves this result.

In fabricating the double threads on an engine lathe, the first helical thread is machined. Then, the gears driving the lead screw of the lathe are disengaged, and the lead screw drive gear is rotated manually 180 degrees and reengaged. This places the cutting tool forming the threads exactly between the first thread formed, and the second thread (both on the extension 124 and inside the bearing shaft 128 may now be cut.

A double flanged stand pipe assembly 130 includes a lower flange 132 which is mounted flush to the top surface of the flange 66 by the bolts 68. Transverse holes 134 through the lower flange 132 align with the holes 70 of the flange 66. In the valve (unlike the arrangement shown in FIG. 6, the holes 60 through the lower main flange 52 are threaded to mate with the threads of the bolts 68. A cylindrical tube 136 is secured at one end to the lower flange 132 and at an upper end to an annular upper flange 138. The flange 138 has holes 140 defined therethrough for freely receiving bearing housing bolts 142. The bolts thread into aligned, threaded holes defined in a lower annular portion of a bearing housing 144 and thereby secure it to the stand pipe assembly 130.

The bearing shaft 128 rotates freely in the bearing housing 144. An upper bearing assembly includes an upper axial bearing 146 and two bearing washers 148 and 150 which separate a upper thrust bearing 152. In similar fashion, a lower bearing assembly includes a lower axial bearing 154 and two bearing washers 156 and 158 which separate a lower thrust bearing 160. An outer lower end portion of the cylindrical bearing housing 144 is provided with threads 162, and these threads are engaged by two locking nuts 164, 166, after the bearing shaft 128 is assembled with the upper and lower bearing assemblies in the bearing housing 144.

A knob 168 is secured by a setscrew 170 to the upper end of the bearing shaft 128 to facilitate manual actuation of the valve 100. As the knob 168 is rotated, the stem extension 124 and central stem 108 move axially.

Automatic Electropneumatic Control 103

Figure 8B:
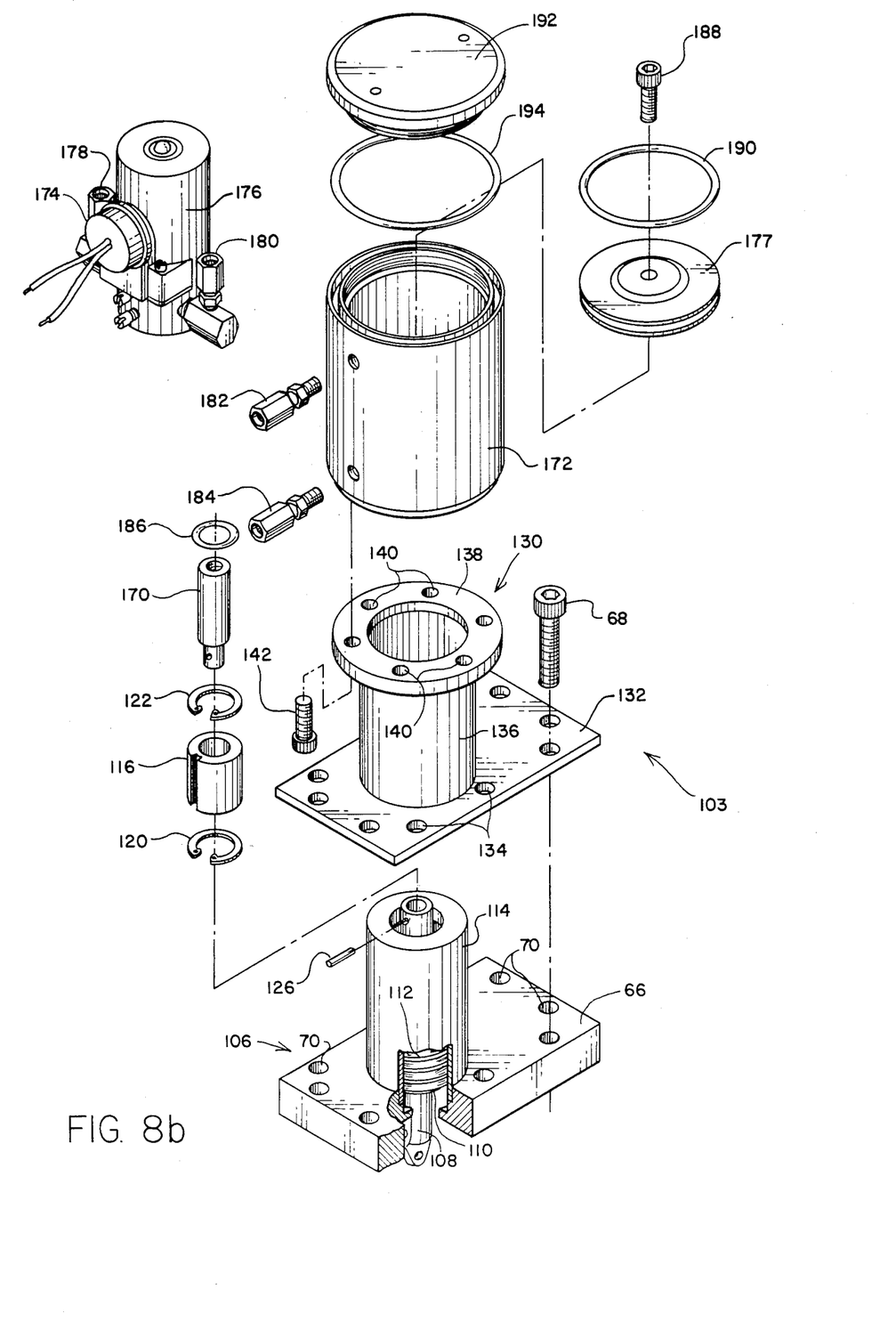
FIG. 8B is an isometric exploded assembly drawing of a control portion of the high vacuum gate valve depicted in FIG. 7 and capable of automatic operation by a controlled electropneumatic actuator assembly.

The automatic electropneumatic control assembly 103 is depicted in FIG. 8B. Therein, a pneumatic stem extension 170 is attached to the central stem 108 by the recessed pin 126. An air cylinder body 172 is attached to the upper flange 138 of the stand pipe assembly 130 by the bolts 142.

An electrical solenoid 174 operates a valve 176 which operates a pneumatic piston 177 slidably disposed inside the body 172. Air lines 178, 180 extend to fittings 182, 184 secured through the cylindrical sidewall of the air cylinder body 172 and thereby apply pressurized air supply to each side of the piston 177, causing the piston 177 to move up or down, depending upon which fitting is receiving pressurized air.

The plunger within the assembly 176 is attached to the pneumatic stem extension 170. An O-ring seal 186 is provided to seal the joint between the pneumatic stem extension 170 and the body 172 so that air pressure does not enter the inside of the stand pipe assembly 130. A bolt 188 secures the piston 177 to the stem extension 170. A piston O-ring 190 is provided to seal the outer cylindrical surface of the piston 177 relative to the inner cylindrical surface of the body 172. A threaded lid 192, sealed by a gasket 194, mates with threads of and seals off the upper end of the body 172.

In practice the valve assembly 176 is supplied with pressurized air, typically at about 20-25 psig air pressure. An air filter/lubricator is recommended for use in the air supply to ensure trouble free operation of the valve assembly 176 and the piston 177. As the piston 177 moves up or down, so does the central stem 108.

Valve Body Section 104

Figure 9:
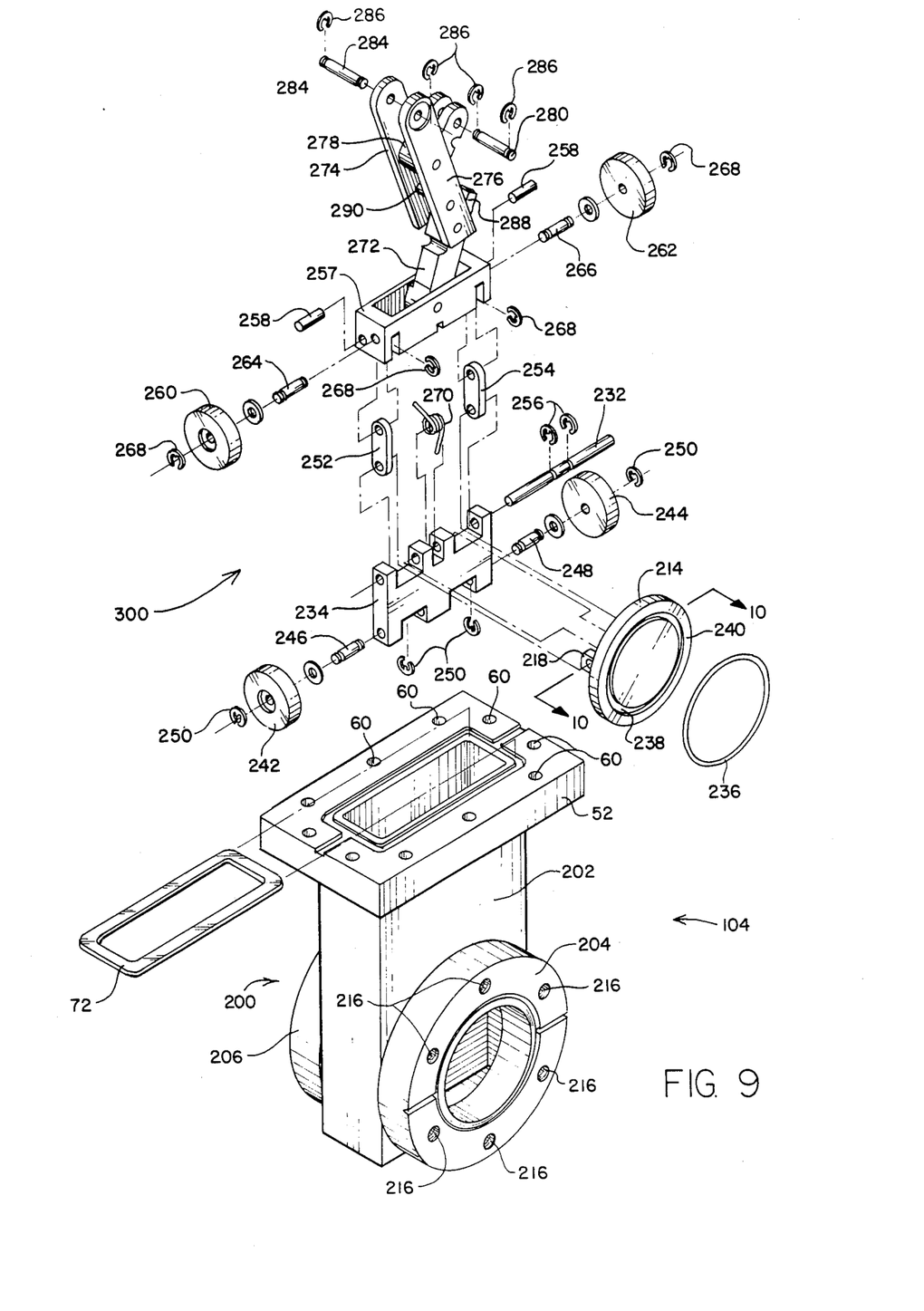
FIG. 9 is an isometric exploded assembly drawing of a base portion of the high vacuum gate valve depicted in FIG. 7, illustrating the components thereof.

The valve body section 104 of the high vacuum gate valve 100 is depicted in FIG. 9. Therein, a valve body assembly 200 includes an enclosed rectangular case 202. The case has an open upper end secured and sealed as by an outer peripheral TIG (tungsten in glass) weld to the lower flange 52. Two cylindrical flanges 204, 206 are secured through cylindrical openings in opposite walls of the case 202. The flanges 204, 206 are machined on both faces, with an interior machined face 208, 210 being recessed so as to fit through and extend slightly beyond the case 202, as shown for example in FIG. 13. An annular TIG weld 212 secures and seals each flange 204, 206 to the case. This method of fabrication and assembly achieves a very precise sealing surface for a gate element 214 without the need to machine the surface inside of the case (an extremely complicated and difficult machine tool set up). Each flange 204, 206 is provided with threaded holes 216 and is machined to provide a conventional annular metal high vacuum joint of the type discussed in connection with FIG. 1.

The rectangular copper seal 72 fits on the sealing surface of the flange 52 as previously explained in connection with FIGS. 4-6, and the holes 60 of the flange 52 are threaded in the FIG. 9 embodiment, so that the bolts 60 may secure the stand pipe lower flange 132 and the upper flange 66 to the flange 52 in the configuration illustrated in FIG. 7.

Figure 10:
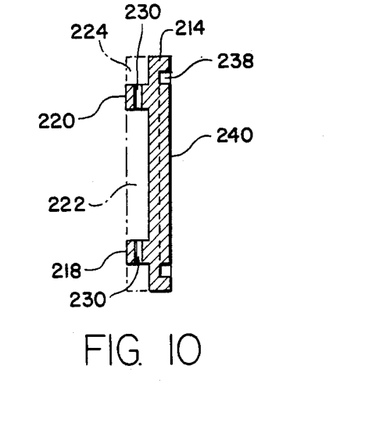
FIG. 10 is a top plan view in section of a unitary gate element of the high vacuum gate valve depicted in FIG. 9, taken along the line 10—10 therein and formed in accordance with one aspect of the present invention.
Figure 11:
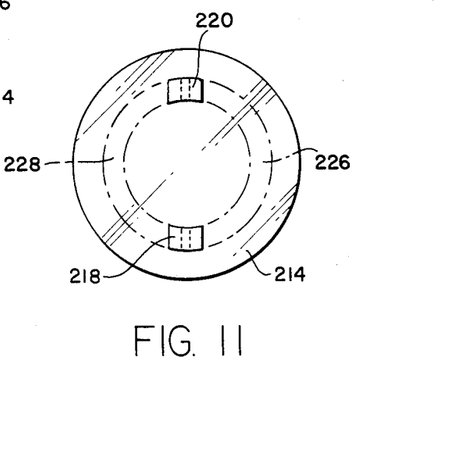
FIG. 11 is a back view in elevation of the gate valve depicted in FIG. 10 illustrating by broken lines the fabrication process yielding a unitary gate valve element.

In one aspect of the present invention, the disk-shaped gate 214 is formed with two integral connecting bosses 218, 220 by machining from a single cylindrical stainless steel workpiece, as illustrated in FIGS. 10 and 11. Annular back portions 222, and 224 of the gate 214 shown by dashed lines in FIG. 10 are cut away by a lathe operation. Then, the remaining raised annular portions 226 and 228 depicted by dashed lines in FIG. 11 are cut off in milling operations, leaving the two bosses 218, 220. Axially aligned holes 230 are then drilled transversely through the bosses 218, 220 to enable a fore carriage link pin 232 to pivotally secure the gate 214 to a fore carriage 234. A metal or elastomer gate o-ring 236 seats in an annular well 238 formed in the sealing surface face 240 of the gate 214.

By forming the gate of a single workpiece, instead of welding bosses onto the back of the gate as was the prior art practice, warpage and misalignment of the gate relative to a sealing surface 210 is thereby avoided, thereby achieving a much more positive, leak free valve 100 than heretofore achieved.

Two carriage wheels 242, 244 are secured to the fore carriage 234 by pins 246, 248 with E-ring locking washers 250, as shown in FIG. 9. As already explained, the fore carriage link pin 232 passes through the holes 230 of the gate bosses 218, 220, and it also passes through axially aligned openings of the fore carriage 234 and through transverse openings at one end of each of two carriage-gate links 252, 254. Two E-ring lock washers 256 secure the pin 232 in place.

The carriage-gate links 252, 254 are pivotally secured to an aft carriage block 256 by pins 258. Two carriage wheels 260, 262 are secured to the aft carriage bloc 256 by pins 264, 266 and E-ring locking wahsers 268. A spring 270 centered about the fore carriage link pin 232 biases the fore carriage 234 into longitudinal alignment with the aft carriage 256, and causes the gate 214 to move away from the opposed sealing surfaces 240, 210 of the gate 214 and the flange 206, respectively.

A lower link 272 is transversely pivotally connected at its lower end to the aft carriage block 256, and at its upper end to a pair of spaced apart, parallel upper links 274, 276. A stem link 278 is pivotally secured for transverse pivotal movement between the links 274 and 276. The stem link 278 is slotted at its upper end and pivotally engages the lower end of the central stem 108. An aft carriage link pin 280 pivotally secures the stem link 278 and the central stem 108.

A boss 282 secured to the underside of the upper flange provides an anchor for the upper links 274 and 276. A pin 284 passes through each link 274, 276 and the boss 282 to enable the links to rotate about the boss in a limited range of arcuate movement. E-ring lock washers 286 secure the pins 278 and 284 in place.

A stop dog 288 extends from the upper end of the lower link 272. This dog 288, shown in FIG. 12, contacts a stop pin 290 when the links 272 and 274-276 are in an "over-center" locking position as shown in FIG. 18 as when the central stem 108 is fully extended.

A carriage assembly 300 includes the wheels 242, 244, 260, 262, the fore carriage 234, the links 252, 254 and the aft carriage 256 and related hardware.

Operation of the Valve 100 (FIGS. 12-19)

Figure 12:
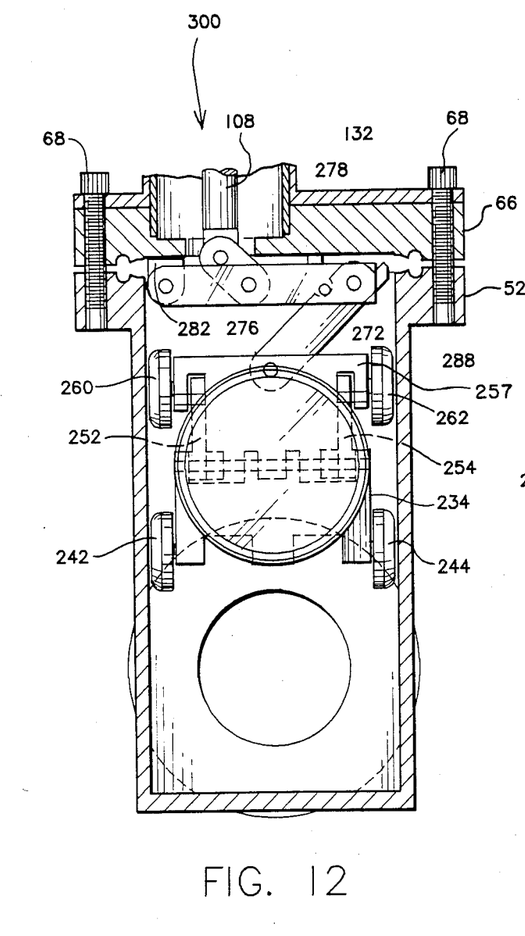
FIG. 12 is a diagrammatic view in front elevation and section of the base portion of the high vacuum gate valve depicted in FIG. 7, showing the gate element in a fully retracted or "valve-open" position.
Figure 13:
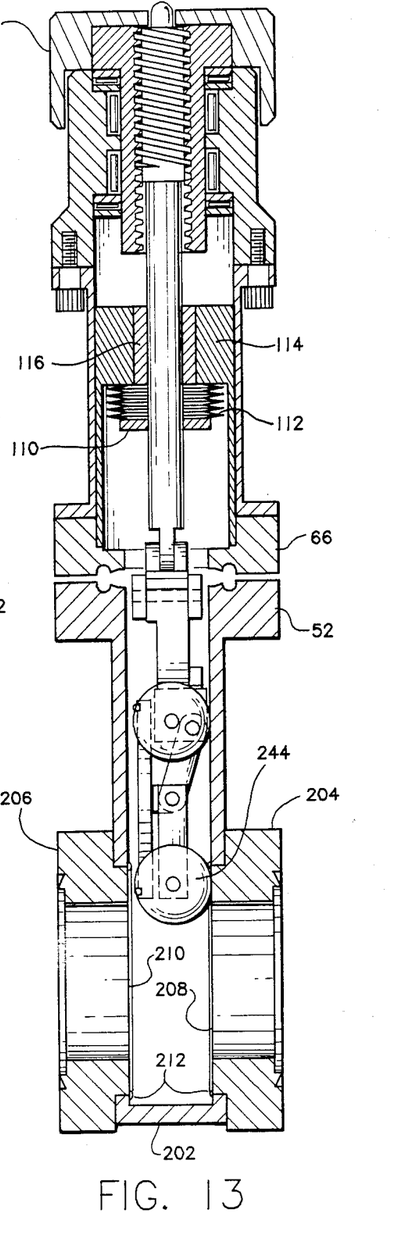
FIG. 13 is a diagrammatic view in right side elevation relative to the FIG. 12 view of the gate valve depicted in FIG. 7 showing the gate element in the fully retracted position illustrated in FIG. 12.

FIGS. 12 and 13 illustrate the valve-open, gate fully retracted position of the valve 100. Therein, the central stem 108 has pulled the links 278, 274-276 and 272 to the position shown in FIG. 12 with the result that the gate carriage assembly 300 has moved on its wheels 242, 244, 260, 262 to a fully retracted position, carrying the gate 214 with it. The spring 270 has biased the fore carriage 234 and gate 214 away from the gate sealing surface 210 of the flange 206. The wheels 242, 244 are in contact with the interior sidewall of the case 202 opposite the sidewall mounting the flange 206.

Figure 14:
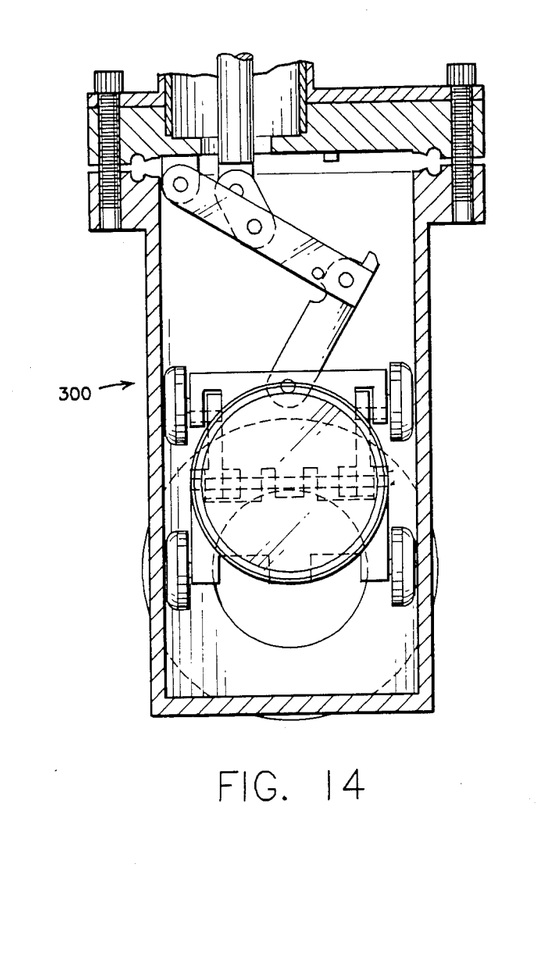
FIG. 14 is similar to the FIG. 12 view and shows the gate element is a half closed position relative to the base.
Figure 15:
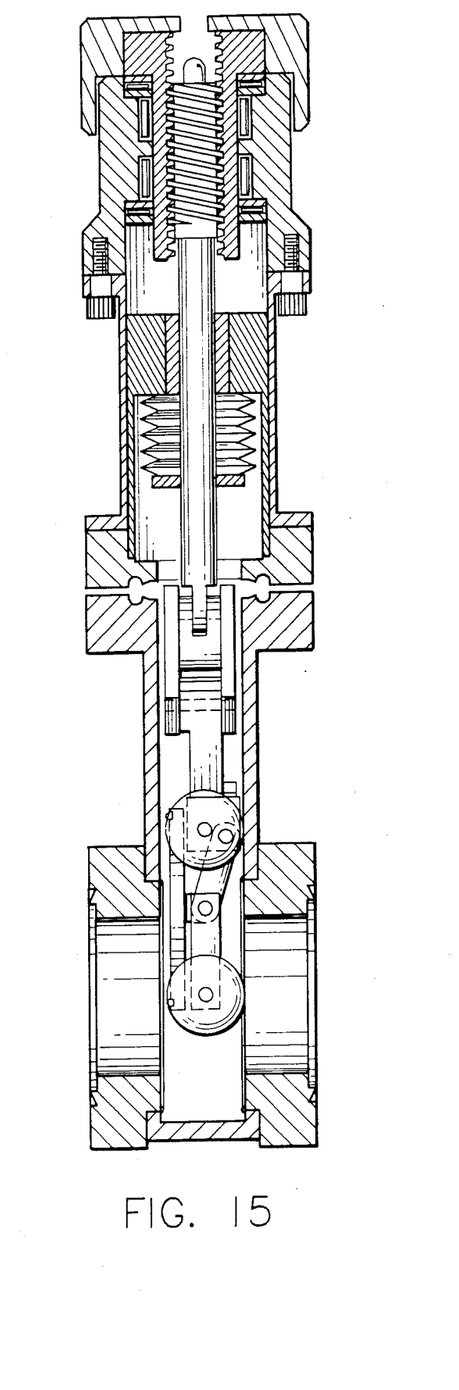
FIG. 15 is similar to the FIG. 13 view and shows the gate element in the half closed position depicted in FIG. 13.

In FIGS. 14 and 15, the carriage 300 has moved to an intermediate position with the passage between the flanges 206 and 204 being partially obstructed by the gate 214.

Figure 16:
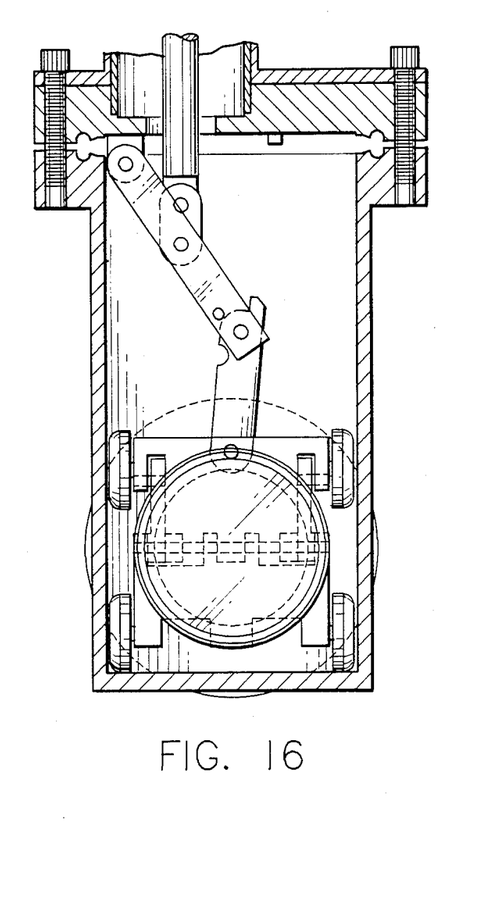
FIG. 16 is similar to the FIG. 12 view and shows the gate element in a closed, but not yet locked, position.
Figure 17:
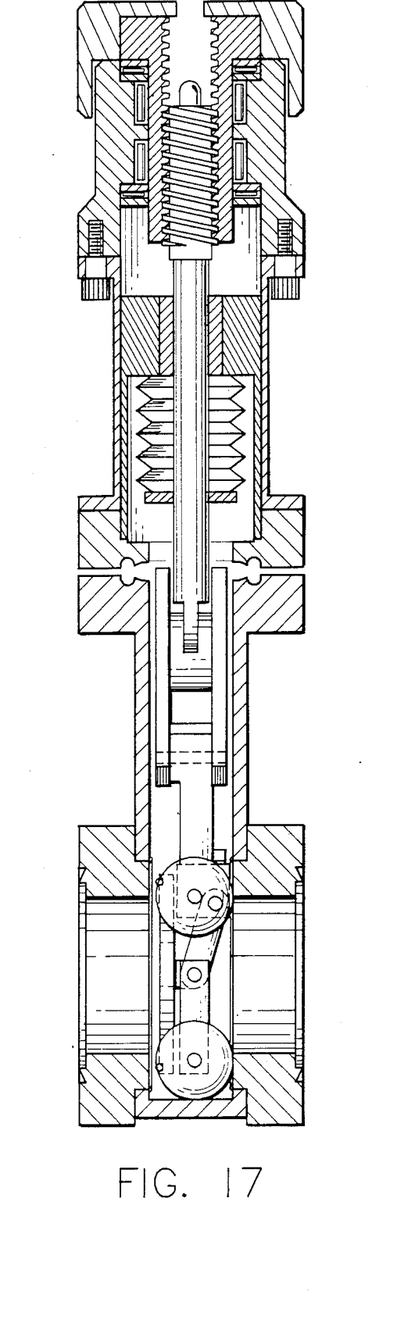
FIG. 17 is similar to the FIG. 13 view and shows the gate element in a closed, but not yet locked, position.

In FIGS. 16 and 17, the carriage 300 has moved the gate into a position completely blocking the passage between the flanges 206 and 204, and the wheels 242, 244 have contacted the bottom wall of the case 202, but the links 272, 274-276 and 278 have not yet reached a maximum extension, and the gate 214 is not sealed against the sealing surface 210.

In FIGS. 18 and 19, the gate 214 has become sealed against the sealing surface 210 of the flange 206. The carriage 300, unable to move longitudinally any farther because of the endwall of the case 300, has moved transversely by becoming axially shortened by pivoting at the link pin 232 as shown in FIG. 19. (The fore carriage 234 and the aft carriage 256 define a more acute angle facing the flange 204 in the locking position.) At the same time, the links 272, 274-276 and 278 have gone beyond center (or longitudinal alignment of the link 272 with the link pair 274-276 to a locking position illustrated in FIG. 18 wherein the stop dog 288 has contacted the stop pin 290. In this locking position of the valve 100, the beyond or over center position of the links 272 and 274-276 automatically causes the gate 214 to remain in a locked and sealed position relative to the sealing surface 210 without need for any residual force to be applied by the central stem 108.

To those skilled in the art to which the present invention pertains, many changes in construction and widely varying embodiments and applications of the invention will suggest themselves without departing from the spirit and scope of this invention as more particularly specified by the following claims. The disclosures and the description herein are purely illustrative and are not intended in any sense to be limiting of the scope of this invention.

I claim:

1. A two part high vacuum gate valve construction comprising a control mechanism part and a valve body part, the control mechanism part including a linearly translatable control stem shaft, and a first generally rectangular high vacuum joint providing flange having a central opening through which the shaft freely passes, and a high vacuum joint providing geometry on the other major face thereof enabling said control mechanism part to be removably joined to and sealed with said valve body part, and displacement means for controllably displacing said shaft, the valve body part including a generally rectangular case secured at an upper end to a second generally rectangular high vacuum joint providing flange having a mirror image sealing geometry to said first high vacuum joint providing flange, two machined fluid flow flanges passing through openings defined through opposite sidewalls of said case and sealed thereto, at least one of the fluid flow flanges having an inside gate sealing surface machined prior to insertion through and sealing of the flange to the sidewall of the case, the fluid flow flanges defining central flow passages and including outer sealing means enabling formation of high vacuum joints with piping to which the valve may be operationally attached, two part, levered carriage means having a central transverse pivot joint and having endwall engagement means for causing said pivot joint to pivot toward said inside gate sealing surface of the one flow flange in response to continued actuation force supplied by said control stem shaft after an inside endwall of said case has been contacted, a valve gate having a sealing surface for engaging the inside gate sealing surface of the one flow flange when the carriage means is opposite the other flow flange and having a back surface with pivoted engagement means, the engagement means engaging the carriage means at the central transverse pivot joint, double jointed linkage assembly means having one link part pivotally fixed to said second flange and linked to said control stem shaft for double jointed arcuate movement as said shaft is moved along its locus of rectilinear limited displacement, and having a second link part linked to said first link part and to said carriage means, for levering actuation force supplied by the central stem shaft to the carriage means thereby to cause said gate to close and then seal.

2. The two part high vacuum gate valve construction set forth in claim 5 wherein said first and second joint providing flanges each comprise in mirror complement geometry to each other a substantially planar face, a generally rectangular, continuously formed trough defined in said face, said trough being substantially semicircular in cross section, and a raised, substantially planar swaging surface continuously formed adjacently inward of and abutting said trough, said swaging surface having an outward upward slope angle with respect to said face, clamping means for clamping the first and second flanges together, and a metal seal providing gasket compressible between the first and second joint providing flanges to achieve a high vacuum joint therebetween.

3. The two part high vacuum gate valve construction set forth in claim 1 wherein said control mechanism part includes a stand pipe housing; a baffle assembly including an expansible baffle having an accordion pleat baffle for sealing the stem shaft relative to the ambient, the baffle expanding and contracting longitudinally throughout the limited displacement range of the stem shaft.

4. The two part high vacuum gate valve construction set forth in claim 3 wherein said displacement means comprises a threaded stem extension connected to the stem shaft, and fixed threaded rotation means journalled to and manually rotatable with respect to the stem pipe housing for engaging said stem extension and when rotated for causing said stem to move along the locus of its limited rectilinear displacement.

5. The two part high vacuum gate valve construction set forth in claim 4 wherein said threaded stem extension and said fixed threaded rotation means are formed with complementary double threads, thereby halving the thread pitch per unit measure without reduction of mechanical engagement between the stem extension and the fixed rotation means.

6. The two part high vacuum gate valve construction set forth in claim 1 wherein said displacement means comprises an automatically controllable operator for enabling automatic actuation of the valve.

7. The two part high vacuum gate valve construction set forth in claim 1 wherein said double jointed linkage assembly means comprises a stop dog formed on one of the one link part and second link part, and a stop pin formed on the other of the one link part and second link part, the stop dog for engaging the stop pin after the one link part and second link part have passed through longitudinal alignment to an over-center locking position, forcing said carriage means bend along said central stem shaft thereby to force said gate into sealing engagement with the inside sealing surface of said one flow flange.

8. The two part high vacuum gate valve construction set forth in claim 1 wherein the pivoted engagement means on the back surface of said valve gate are formed by the process of latching two recessed annuli therein so as to define a raised annulus and then by milling off opposed equal length chords of the annulus thereby leaving two raised integral bosses.

9. The two part high vacuum gate valve construction set forth in claim 1 wherein said sealing surface of said valve gate includes annular sealing ring means for engaging said inside sealing surface of said one flow flange to achieve a high vacuum seal therewith.

10. The two part high vacuum gate valve construction set forth in claim 3 wherein said baffle assembly includes a bonnet enclosure, a bushing mounted to the bonnet enclosure for precisely aligning the stem shaft for limited displacement rectilinear movement, an expansible baffle having an accordion pleat baffle with an interior space communicating with the ambient and an exterior space, the baffle having one end sealed to an inside end wall of the bonnet and having another end sealed to an annulus formed on said shaft, the baffle expanding and contracting longitudinally throughout the limited displacement range of said shaft.

* * * * *